Figure 3:
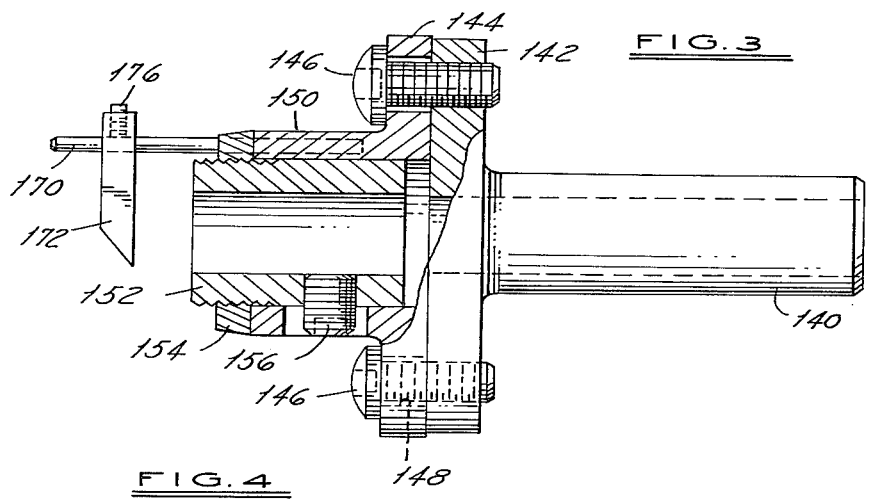

United States Patent [19]

Spang

[11] 3,995,514
[45] Dec. 7, 1976

[54] METHOD AND APPARATUS FOR TOOL SUPPORT AND ADJUSTMENT IN TURRET-TYPE AUTOMATIC SCREW MACHINES

[76] Inventor: Charles M. Spang, 20520 Stephens, St. Clair Shores, Mich. 48080

[22] Filed: Oct. 2, 1975

[21] Appl. No.: 619,053

[52] U.S. Cl. .............................................. 82/36 R
[51] Int. Cl.² ...................................... B23B 29/00
[58] Field of Search ............. 82/34 R, 36 R, 36 A; 90/11 F, DIG. 12; 279/1 S, 83; 408/153, 158

[56] References Cited
UNITED STATES PATENTS

| | | | |
|---|---|---|---|
| 2,860,883 | 11/1958 | Better et al. | 279/1 S |
| 3,380,326 | 4/1968 | Waddy | 82/36 |
| 3,838,616 | 10/1974 | Minder | 82/36 A |

*Primary Examiner*—Harrison L. Hinson
*Attorney, Agent, or Firm*—Barnes, Kisselle, Raisch & Choate

[57] ABSTRACT

A method and apparatus for achieving accurate axial tool adjustment in an automatic turret-type screw machine which avoids the necessity of loosening the barrel tightening screws on the tool mount for axial tool adjustment and provides micrometer adjustment for the tool as well as a gauge for reset of the tool in replacement after breakage or re-grinding. A rough-adjustment tool back-stop is provided which subsequently moves with the micrometer adjustment. A tool locking collet arrangement is provided which can be moved with the back-up screw against spring tension to assure solid tool clamping while permitting micrometer controlled axial motion for initial set-up and tool replacement.

7 Claims, 5 Drawing Figures

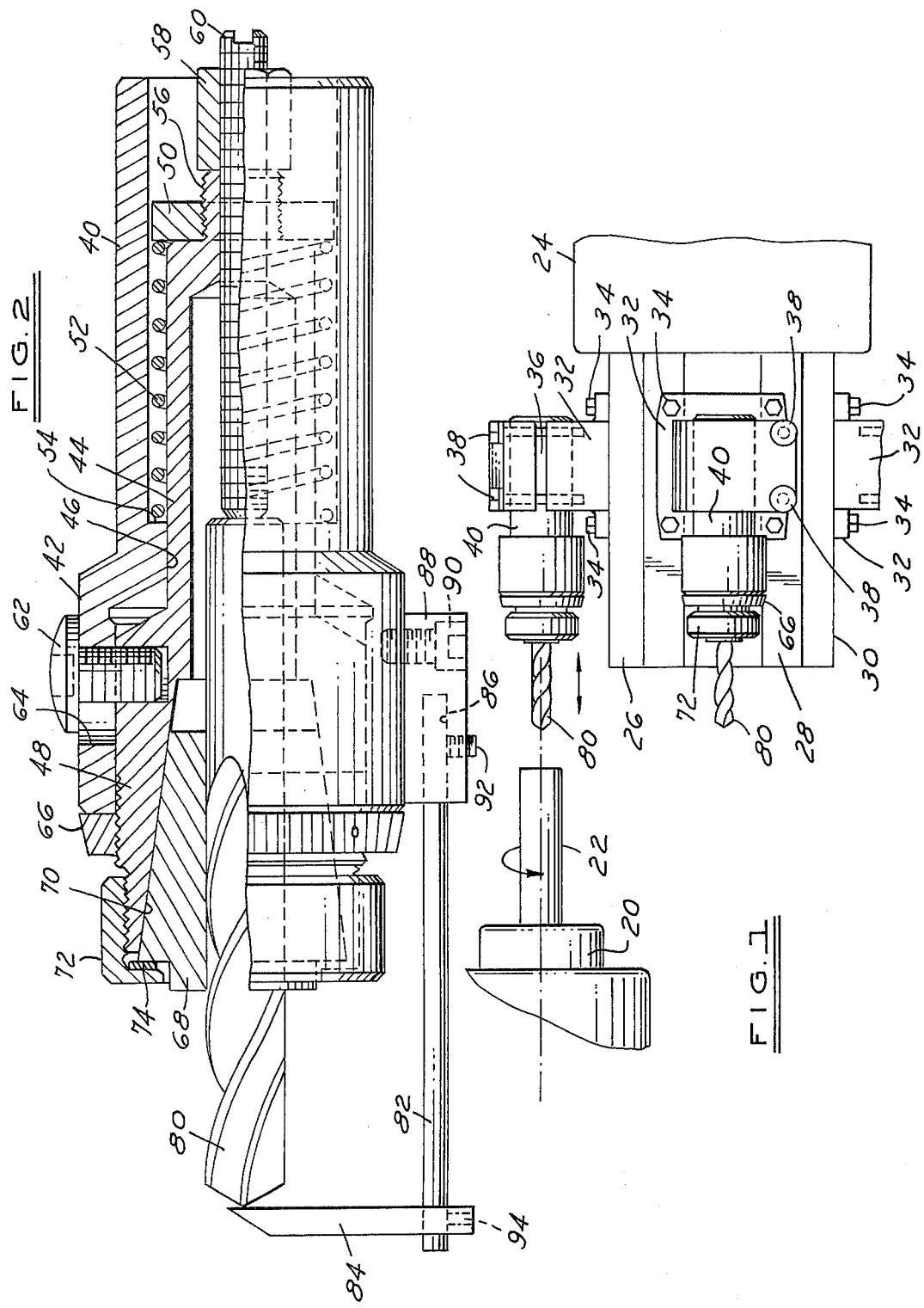

METHOD AND APPARATUS FOR TOOL SUPPORT AND ADJUSTMENT IN TURRET-TYPE AUTOMATIC SCREW MACHINES

This invention relates to a Method and Apparatus for Tool Support and Adjustment in Turret-Type Automatic Screw Machines.

In a multiple tool (turret-type) automatic screw machine, there is a driven spindle in which the work piece is held and rotated. The work piece is usually a bar or rod of steel. Various cutting operations are performed on the end of the work piece, as it is rotated, by moving tools into contact with the work. The tools are clamped on a turret which has a multiplicity of circumferentially spaced ways for mounting the tools. The turret or the work spindle is rotated, that is, indexed, to bring various tools selectively into proper axial position relative to the work, and then the turret is advanced manually or automatically toward the work to cause the desired removal of metal.

The tools are usually clamped to the turret and adjusted axially to a proper position by loosening the clamping screws and then tapping the tool to a position where it is again clamped and tried. Thus, by trial and error a tool is finally set in a proper axial position and the work is started. In automatic screw machines where work feed and tool feed is very rapid, hundreds of parts are made in rapid succession. Thus, an accurate adjustment is extremely important.

Also, work pieces are changed frequently in the various jobs to be done and it is important to be able to set up rapidly to avoid prolonged down-time. When the set up is accomplished by adjusting tools by trial and error until a satisfactory part is obtained, it will be appreciated that delays are inevitable. Also, when it becomes necessary to resharpen, replace and reset the tools, and set them again by trial and error, the same delay occurs before the machine can be turned on automatic to start the desired rapid production of parts.

It is an object of the present invention to provide an axial adjustment for a tool mount which permits advance and retraction of a particular cutting tool without releasing the clamping force on the tool in the clamping mechanism which is on the turret way.

Radial adjustment in boring tool mounts is known as illustrated in the U.S. Pat. to D. H. Vogel, No. 3,447,403, issued June 3, 1969. Another adjustment structure for use in quick-change chucks is shown in a U.S. Pat. No. to R. G. Koch, No. 3,347,115, issued Oct. 17, 1967. The object of the present invention is the utilization of an accurate axial adjustment on a tool turret of an automatic screw machine.

It is a further object to provide a detailed adjustment construction which is designed particularly for use on the ways of a turret-type screw machine.

It is a further object of the invention to provide a tool mount for a screw machine tool turret which provides the operator with complete and accurate control when setting or adjusting the working tool.

A still further object lies in the provision of a method and apparatus for permitting removal of a tool for sharpening or replacement and re-insertion of the tool to the exact position it held prior to removal. Here again, there is a saving in time and elimination of scrap which results from the trial and error system of location.

A further object of the invention lies in a construction of a tool mount which allows an operator to compensate for any misalignment between tool and work piece.

Other objects and features of the invention will be apparent in the following description and claims in which the principles of the invention are set forth together with details of construction and operation in connection with the best mode presently contemplated for the practice of the invention.

Drawings accompany the disclosure and the various views thereof may be briefly described as:

FIG. 1, a view of a work spindle of a screw machine and a tool turret.

FIG. 2, an enlarged side view, partially in section, of an axially adjustable tool carrier.

FIG. 3, a side view of a modified tool carrier.

Figure 4:
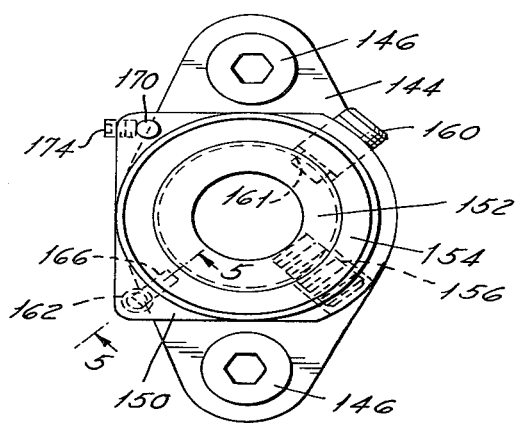

FIG. 4, an end view of the carrier of FIG. 3.

Figure 5:
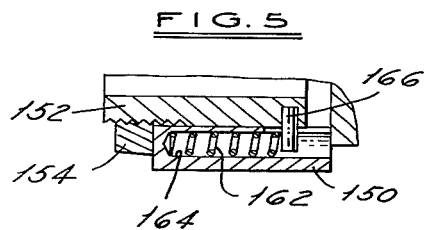

FIG. 5, a sectional view taken on line 5—5 of FIG. 4.

With reference to the drawings, portions of an automatic screw machine are shown to illustrate the orientation of the tool relative to the work. In FIG. 1, the machine is provided with a driven work spindle 20 which carries a rotating work piece 22 in the form of a bar stock. Also, on the automatic screw machine is the tool turret 24 which has a multiplicity of slides, one of which is shown on the top of the turret at 26, another of which is shown on the side of the turret at 28. A bottom slide is shown at 30 and another slide would be mounted on the other side of the turret not shown. The turret, of course, could have six or eight tools on it as well as the four that are shown.

This turret or the work spindle will index to place each tool mounted thereon in co-axial alignment with the work piece. The slide will also move in an axial feed motion to and from the work at a certain prescribed distance which is set for any particular tool and cycle. Thus, if a hole is to be drilled in the work to a certain depth and the turret has a predetermined forward feed toward the work, it is important that the tool on the turret be accurately located to provide the proper depth of hole, ream or chamfer.

It will be seen that there is mounted on each slide a tool mount bracket 32 which is held on the slides of the turret by bolts 34. Each bracket has a cylindrical wall which is split at 36 with a cylindrical recess which receives the cylindrical barrel of a toolholder. The bracket has tightening bolts 38 which clamp down on the cylindrical barrel of the toolholder. It will be seen that if the tool is fixed in the toolholder, it will be necessary to release the bolts 38 each time that the tool is to be adjusted axially. This has been the common way of achieving axial adjustment on multiple turret automatic screw machines. The operator releases the bolts 38 and taps the tool shank forward or backward to get his adjustment and then proceeds to test it to determine whether it is proper. This results in a number of scrap pieces before the machine can be put in an automatic cycle.

In the present invention, the brackets 32 clamp around a cylindrical tool shank or barrel 40 for the axially adjustable tool which is shown in detail in FIG. 2. The tool barrel 40 is a hollow cylinder which enlarges at 42 in an integral portion which is also hollow to provide a cylindrical recess at the fore end of the barrel. The tool shank 40, which may also be referred to as the barrel, of the adjustable tool is provided with an axial sleeve 44 which has a rear portion which slides in a portion of the barrel at 46 and a forward portion 48 which is slidably mounted in the enlarged portion 42 of the barrel. The rear portion of the axial sleeve 44 carries a spring retainer 50 which retains a compression coil spring 52 seated against a shoulder 54 in the barrel and retained at the rear by the retainer 50. This spring prevents loosening of the parts and backlash in the adjustment.

The rear end of the sleeve 44 has a threaded thimble or boss projection 56 which carries the spring retainer 50, threaded thereon, and behind the boss 56 is a stop lock nut 58. A tool stop screw 60 is threaded in the boss 56 and carries the stop lock nut 58 so that when the collet is loosened, the tool stop may be adjusted axially to a predetermined position relative to the axial sleeve 44. The forward end 48 of the axial sleeve is slidably mounted in the enlarged portion 42 of the barrel and can be locked in position by a head screw 62 movable in a slot 64 and threaded into the portion 48 of the sleeve. The forward end of the sleeve 48 is also provided with threads on two diameters. The larger diameter carries threaded micro-adjusting ring 66 which is provided with suitable circumferentially spaced markings to provide the operator with a reading on the adjustment. The ring 66 is, therefore, mounted at the tool end of the assembly so it is easily accessible and readily visible to facilitate the fine adjustment. The ring bears against the front face of barrel 42 and is held in this position by the coil spring 52.

A split collet 68 is carried in a tapered hole 70 in the sleeve and this is retained by a collar 72 which is threaded on the smaller threads at the end of the sleeve head 48. A needle bearing assembly 74 is provided between the radial flange of the collet retainer 72 and a forward shoulder on the collet 68. The collet 68 carries and locks in place the tool 80 which can be any type of metal removing tool such as a drill, reamer, or counterbore tool.

For the convenience of the operator, a locating rod with a tool stop can be provided. In FIG. 2, this rod 82 carries a locating finger 84. The rod is mounted in a drilled recess 86 in a locator support 88 which is held on the barrel 44 by a screw 90. A readily releasable screw 92 can hold the rod 82 in a position for use in gaging, and, when loosened, can permit the finger 84 and rod 82 to be removed until need for a further setting. A set screw 94 controls the location of the finger 84 on the rod 82. Thus, if a new or reground tool 80 is inserted in the collet 68 after releasing the collar 72, it may be seated against the back stop screw 60 and the sleeve 44 moved ahead or back by the micro-ring 66 until the point of the tool gauges with the finger 84. Then, the operator can be assured that the tool has the same position as the tool previously retained.

In the operation of the device, it will be seen that the tool carrying barrel 40, FIG. 1, can be mounted in the split sleeves of the bracket 32 in an approximate axial position. The tool 80 can be then inserted in the collet 68 and the back stop screw 60 adjusted axially so that the tool has the proper axial relationship with respect to the work and in conjunction with the forward feed of the turret. After the initial positioning of the tool and the collet is tightened, the micro-adjusting ring 66 can be utilized to achieve very accurate axial location of the tool relative to the turret and the work. The tool position axially in the sleeve 44 can be determined by the use of the adjusting finger 84. The finger and the carrying rod 82 are then removed and the machine may be operated in an automatic cycle. Each tool on each tool slide or way is similarly adjusted to perform its particular operation of the work.

If it is necessary to regrind the tools or to replace them, the same setting can be readily accomplished by using the present finger gauge assembly 82–84. Similarly, the micro-adjusting collar or ring 66 permits very fine axial control of the tool during the initial set-up and it is necessary only to release the screw 62 to permit the adjustment and then to tighten the screw to maintain it. This saves the operator from releasing the split sleeve screws 38 each time an adjustment of the tool is required. It will be appreciated that the screw 62 also provides the circumferential lock between the barrel 40 and the sleeve 44; no key and slot is necessary.

In FIGS. 3, 4 and 5, a modified structure is shown wherein axial adjustment is permitted as well as a compensation for eccentricity. The tool shown in FIG. 3 has a barrel 140 for mounting in the split sleeves of the bracket 32 on the turret. This barrel 140 has a radial flange 142 extending in opposite directions to support a similarly shaped flange 144 which is held to the flange 142 by socket head bolts 146. The flange 144 has enlarged openings 148 so that it may be shifted radially on the flange 142 when the screws 146 are loosened.

An axial collar 150 on the flange 144 supports an axial sleeve or bushing 152 slidingly received in the collar 150 and the sleeve 152 is disposed to support the shank of a tool such as shown at 80 in FIG. 2. Threaded on to the sleeve 152 is a micro-adjusting ring 154.

A set screw 156 shown in FIG. 3 and FIG. 4 is provided to lock a tool in the sleeve 152. A set screw 160, shown in FIG. 4, is utilized to lock the sleeve 152 in the collar 150 against axial movement and also circumferential dislocation. The inner end of screw 160 preferably moves in an axial slot 161 in sleeve 152.

In order to provide a spring tension on the parts to prevent back-lash and vibratory change in position, a compression spring 162 is mounted in a recess 164 shown in FIG. 5. The spring recess is drilled into the collar 150 and the spring seats against one end of the recess and also against a retaining pin 166 carried in the sleeve 152. More than one spring assembly can be used if desired.

It will be seen from the above description that the sleeve or bushing 152 can be utilized to mount drills, reamers, centerbores and the like which can be clamped in the collar 150. Since the holes 148 are larger than the diameter of the clamping bolts 146, the forward body flange 144 can float in a limited direction radially allowing the cutting tool to align itself to the centerline of the work piece. After alignment has been accomplished, the clamping bolts 146 are tightened to secure the cutting tool in fixed alignment to the workpiece. The embodiment shown in FIG. 3 is also subject to the axial adjustment by the micrometer ring 154 as described in connection with FIG. 2 and has a locator rod 170 and a finger 172 to serve the same function as that described with relation to FIG. 2. A set screw 174 holds the rod in place and a set screw 176 holds the finger on the rod when it is to be used for gaging.

It will thus be seen that in a turret-type automatic screw machine, there is provided a tool mount which can be easily adjusted axially by a rotation of a micrometer ring and without the necessity of releasing the bolts which clamp the tool barrel on the slide bracket. This has been accomplished in a device which is relatively simple to manufacture and which can be utilized in the turret-type screw machines now in operation.

What I claim is:

1. In combination, in an automatic, turret-type screw machine having a turret tool support provided with tool supporting ways,
   a. a bracket mount on each way having a split sleeve to receive a tool support barrel,
   b. a tool mount for each bracket mount having a barrel portion to be received in the split sleeve of the bracket mount and having a recess for receiving a tool sleeve, said recess having a rearwardly facing shoulder,
   c. means for clamping the barrel portion in the bracket mount,
   d. a tool sleeve slidably mounted within each tool mount having a shoulder on the inner end,
   e. spring means abutting at each end against said shoulders for urging each said sleeve in an axial tool retractive direction, and
   f. means movably mounted on said tool sleeve to move said tool sleeve to a desired axial position within said tool mount and to retain said tool sleeve in said desired position.

2. A combination as defined in claim 1 in which a tool gauge is mounted on said assembly comprising a rod extending axially outward from said tool mount in a direction parallel to a tool to be carried on said mount but spaced radially outward of said tool, and a gauge finger on said rod swingably movable to said tool to check the axial position of the tool.

3. A combination as defined in claim 1 in which said tool mount is adjustably movable in a limited radial motion to permit centering of said tool sleeve relative to a rotating work piece.

4. In combination, in an automatic, turret-type screw machine having a turret tool support provided with tool supporting ways,
   a. a bracket mount on each way having a split sleeve to receive a tool support barrel,
   b. a tool mount for each bracket mount having a barrel portion to be received in the split sleeve of the bracket mount,
   c. means for clamping the barrel portion in the bracket mount,
   d. a tool sleeve slidably mounted within each tool mount,
   e. spring means for urging each said sleeve in an axial tool retractive direction,
   f. means movably mounted on said tool sleeve to move said tool sleeve to a desired axial position within said tool mount and to retain said tool sleeve in said desired position,
   g. said tool sleeve having a tool receiving split collet at a forward end to lock a tool in axial position relative to said sleeve, and
   h. a back-up screw threaded into the rear end of said tool sleeve extending into a tool recess to provide a stop for the inserted end of a tool held in said collet.

5. A combination as defined in claim 4 in which:
   i. said spring means comprises a coil spring surrounding a rear portion of said tool sleeve and bracket at one end by a shoulder on said tool mount, and
   j. a spring locator on said tool sleeve at the rear end thereof to cause said sleeve to be retracted by said spring in said tool mount.

6. A combination as defined in claim 4 in which:
   k. a boss is formed at the rear end of said tool sleeve and said spring locator comprises a washer located on said boss, and
   l. a lock nut on said back-up screw positioned to bear against said boss.

7. In combination, in an automatic, turret-type screw machine having a turret tool support provided with tool supporting ways,
   a. a bracket mount on each way having a split sleeve to receive a tool support barrel,
   b. a tool mount for each bracket mount having a barrel portion to be received in the split sleeve of the bracket mount,
   c. means for clamping the barrel portion in the bracket mount,
   d. a tool sleeve slidably mounted within each tool mount,
   e. spring means for urging each said sleeve in an axial tool retractive direction,
   f. means movably mounted on said tool sleeve to move said tool sleeve to a desired axial position within said tool mount and to retain said tool sleeve in said desired position, and
   g. a headed locking screw threaded into said tool sleeve and located in an axial slot in said tool mount to permit axial motion of said tool sleeve relative to said tool mount and to lock said sleeve and said mount in an adjusted position.

* * * * *